United States Patent
Lee

(10) Patent No.: US 8,279,333 B2
(45) Date of Patent: Oct. 2, 2012

(54) CAMERA DOOR OPENING AND SHUTTING APPARATUS FOR PORTABLE COMMUNICATION DEVICE

(75) Inventor: Byung-Joon Lee, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 571 days.

(21) Appl. No.: 12/241,859

(22) Filed: Sep. 30, 2008

(65) Prior Publication Data

US 2009/0086088 A1 Apr. 2, 2009

(30) Foreign Application Priority Data

Oct. 1, 2007 (KR) .................. 10-2007-0098728

(51) Int. Cl.
*H04N 5/225* (2006.01)
*H04N 5/228* (2006.01)

(52) U.S. Cl. ...... 348/373; 348/374; 348/376; 348/208.7

(58) Field of Classification Search .................. 396/448, 396/349, 538; 348/374, 296, 208.7, 373, 348/376
See application file for complete search history.

(56) References Cited

U.S. PATENT DOCUMENTS

| | | | | |
|---|---|---|---|---|
| 5,892,996 A * | 4/1999 | Yokota | ........................... | 396/349 |
| 6,264,378 B1 * | 7/2001 | Katoh et al. | .................. | 396/348 |
| 2003/0151678 A1 * | 8/2003 | Lee et al. | .................... | 348/231.4 |
| 2003/0174240 A1 * | 9/2003 | Wada et al. | .................... | 348/374 |
| 2004/0190892 A1 * | 9/2004 | Yamane | ........................ | 396/448 |
| 2005/0013038 A1 * | 1/2005 | Abe | .............. | 360/97.01 |
| 2005/0225668 A1 * | 10/2005 | Kim | .............................. | 348/373 |
| 2006/0056838 A1 * | 3/2006 | Chen | ............................. | 396/448 |
| 2006/0088311 A1 * | 4/2006 | Lu | ................................. | 396/448 |
| 2006/0163095 A1 * | 7/2006 | Yanagisawa et al. | ....... | 206/316.2 |
| 2007/0025726 A1 * | 2/2007 | Kim | ............................... | 396/448 |
| 2008/0019741 A1 * | 1/2008 | Lee et al. | .................... | 399/302 |
| 2009/0086088 A1 * | 4/2009 | Lee | .............................. | 348/374 |

FOREIGN PATENT DOCUMENTS

| | | | |
|---|---|---|---|
| CN | 1991563 A | | 7/2007 |
| KR | 1020040104358 | * | 12/2004 |
| KR | 1020060003934 | * | 1/2006 |

OTHER PUBLICATIONS

Chinese Office Action issued Jan. 26, 2011 in corresponding CN Application 200810149799.8 with an English language translation.

* cited by examiner

*Primary Examiner* — Jason Chan
*Assistant Examiner* — Stephen Coleman
(74) *Attorney, Agent, or Firm* — H. C. Park & Associates, PLC

(57) ABSTRACT

The present invention discloses a camera door opening/shutting apparatus for a portable communication device. The apparatus includes a camera door disposed at a main body to expose or cover a camera lens included in the main body according to a sliding movement of the camera door, and a door sliding part disposed between the main body and the camera door to slidably couple the camera door with the main body.

12 Claims, 10 Drawing Sheets

| LEGEND | |
|---|---|
| 20 | camera door |
| 31 | guide member |
| 32 | sliding member |

| LEGEND | |
|---|---|
| 21 | mounting groove |
| 22 | fixing part |
| 31 | guide member |
| 32 | sliding member |

| LEGEND | |
|---|---|
| 32 | sliding member |
| 41 | guide hole |
| 42 | damper member |
| 43a | first stopper |
| 43b | second stopper |

| LEGEND | |
|---|---|
| 23 | rubber part |
| 31 | guide member |
| 32 | sliding member |
| 41 | guide hole |
| 42 | damper member |
| 43a | first stopper |
| 43b | second stopper |

| LEGEND | |
|---|---|
| 1a | camera lens |
| 32 | sliding member |
| 41 | guide hole |
| 42 | damper member |
| 43a | first stopper |
| 43b | second stopper |

CAMERA DOOR OPENING AND SHUTTING APPARATUS FOR PORTABLE COMMUNICATION DEVICE

CROSS REFERENCE TO RELATED APPLICATION

This application claims priority from and the benefit of Korean Patent Application No. 2007-0098728, filed on Oct. 1, 2007, which is hereby incorporated by reference for all purposes as if fully set forth herein.

BACKGROUND OF THE INVENTION

1. Field of the Invention

The present invention relates to a camera door opening/shutting apparatus of a portable communication device, which can slide a camera door so as to expose/cover a camera lens.

2. Discussion of the Background

In general, "a portable communication device" means a device that allows a user to wirelessly communicate with another person while carrying it. Such a portable communication device includes a hand held product ("HHP"), a cordless telecommunications device, version 2 ("CT-2") cellular phone, a digital phone, a Personal Communication Service ("PCS") phone, a personal digital assistance ("PDA") or the like. Also, portable communication devices are classified into various types according to their appearance. For example, according to their appearance, wireless terminals may be bar-type terminals, flip-type terminals, or folder-type terminals.

The bar-type wireless terminal has a single housing shaped like a bar, and the flip-type wireless terminal has a flip rotatably coupled to a bar-shaped housing by a hinge device. The folder-type wireless terminal has a folder connected to a single bar-shaped housing by a hinge device in such a manner that the folder can rotate to fold onto or unfold from the housing.

In addition, the conventional portable communication device includes a photographing device, such as a camera, to perform image communication. A user can perform such image communication with other users or can photograph a desired object by using the photographing device.

Flip-type or folder-type terminals have been recently used portable communication devices that have a main function of performing voice communication or image communication. The camera lens is typically mounted in a body of a flip-type terminal. Whereas, the camera lens is typically mounted in a hinge device or a folder of a folder-type terminal.

A portable communication device having a camera lens mounted therein allows a user to freely move while carrying it and to take pictures and moving pictures through the lens.

However, in a portable communication device having a conventional camera lens mounted therein, dust and alien material can easily form on a surface of the camera lens. Therefore, when the user performs image communication and photographs a subject by using the lens in a state where dust and alien material are on the surface of the lens, photographed pictures or moving procures may be vague or unclear.

Also, because of use of a small-sized camera, a hole formed for a surface of the camera lens is very small. Therefore, it may be difficult to remove alien material formed within the hole.

Further, since the camera lens is always exposed, it may not be possible for people to determine whether someone with the device is photographing something without their permission.

SUMMARY OF THE INVENTION

The present invention provides a camera door opening/shutting apparatus for a portable communication device, which has a structure where a camera door is slid so as to expose/cover a camera lens and so that the camera door can be easily opened/shut.

The present invention also provides a camera door opening/shutting apparatus in which effectiveness of using a camera in a product is improved, the camera lens is protected, and it is possible to prevent dust and alien material from attaching to the camera lens.

The present invention also provides a camera door opening/shutting apparatus for a portable communication device, which has a damper part for restricting sliding movement or absorbing impact while a camera door moves so that the camera door can be easily slid.

Additional features of the invention will be set forth in the description which follows, and in part will be apparent from the description, or may be learned by practice of the invention.

The present invention discloses a camera door opening/shutting apparatus for a portable communication device that includes a camera door disposed at a main body so as to expose/cover a camera lens included in the main body according to a sliding movement of the camera door, and a door sliding part disposed between the main body and the camera door to slidably couple the camera door with the main body.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
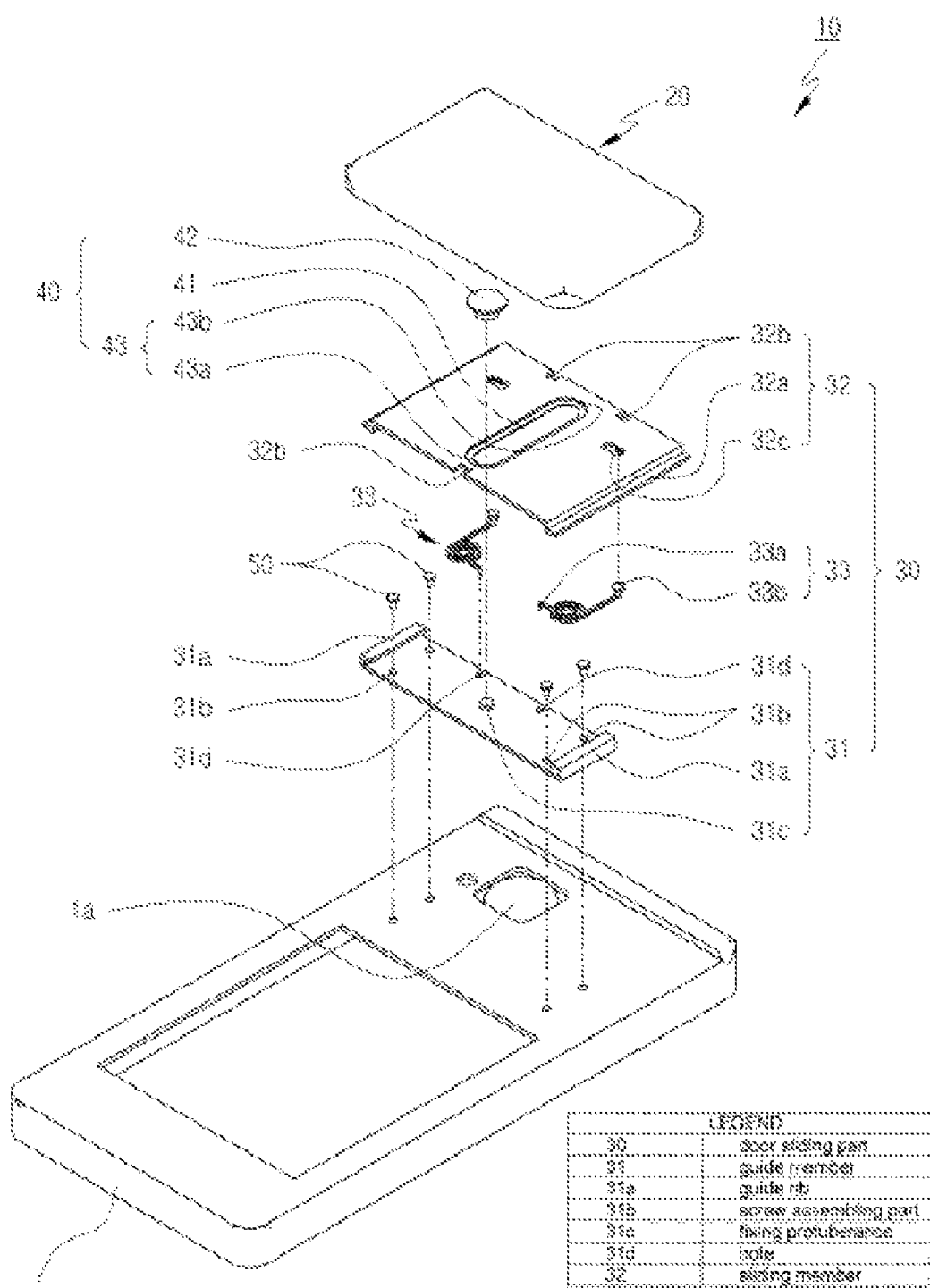
FIG. 1 is an exploded perspective view of a structure of a camera door opening/shutting apparatus for a portable communication device according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "coupled with" another element or layer, it can be directly on or directly coupled with the other element or layer, or intervening elements or layers may be present. In contrast, when an element is referred to as being "directly on" or "directly coupled with" another element or layer, there are no intervening elements or layers present.

Figure 2:
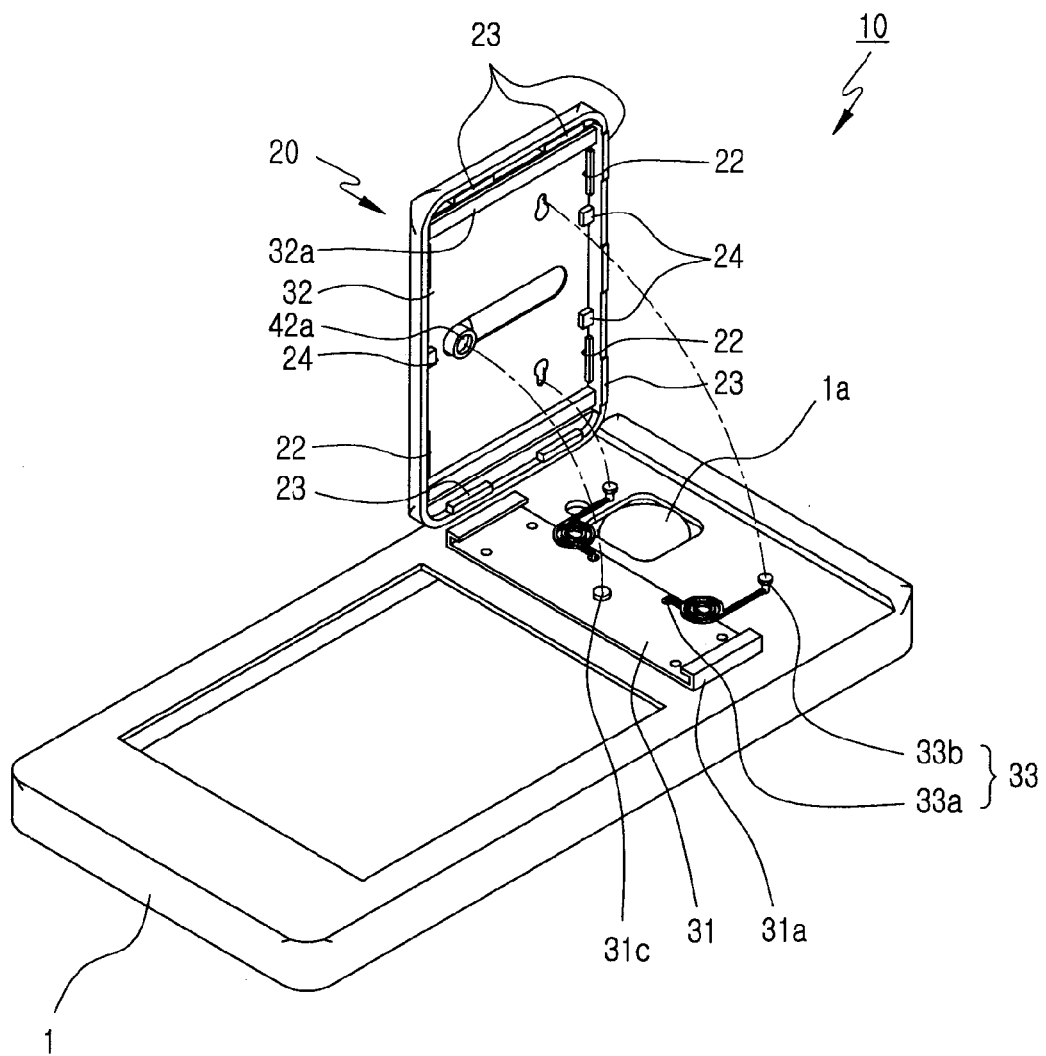
FIG. 2 is an exploded perspective view of a camera door opening/shutting apparatus for a portable communication device according to an exemplary embodiment of the present invention, in which a camera door is in a disassembled state.

As shown in FIG. 1 and FIG. 2, a camera door opening/shutting apparatus 10 of a portable communication device includes a camera door 20 and a door sliding part 30. In order to expose and cover a camera lens 1a included in a body 1 according to a sliding movement of the camera door 20, the camera door 20 is included in the main body 1 of the portable communication device. The door sliding part 30 is included between the main body 1 of the portable communication device and the camera door 20 so as to allow the camera door 20 to be slidably coupled with the main body 1.

As shown in FIG. 1, FIG. 2, FIG. 3, FIG. 4, FIG. 5, FIG. 6, FIG. 7, FIG. 8, FIG. 9, and FIG. 10, the door sliding part 30 includes a guide member 31, a sliding member 32, and a pair of elastic members 33. The guide member 31 is coupled with the main body 1 of the portable communication device in such a manner that the guide member 31 can be slidably coupled with the sliding member 32, which will be described below. The sliding member 32 is coupled with the camera door 20 in such a manner that the sliding member 32 can slide while facing the guide member 31. The pair of elastic members 33 is disposed between the guide member 31 and the sliding member 32 so as to provide a force that allows the camera lens 1a to be covered when the camera door 20 moves less than a predetermined distance, and to provide a force that allows the camera lens 1a to be exposed when the camera door moves more than the predetermined distance.

Figure 3:
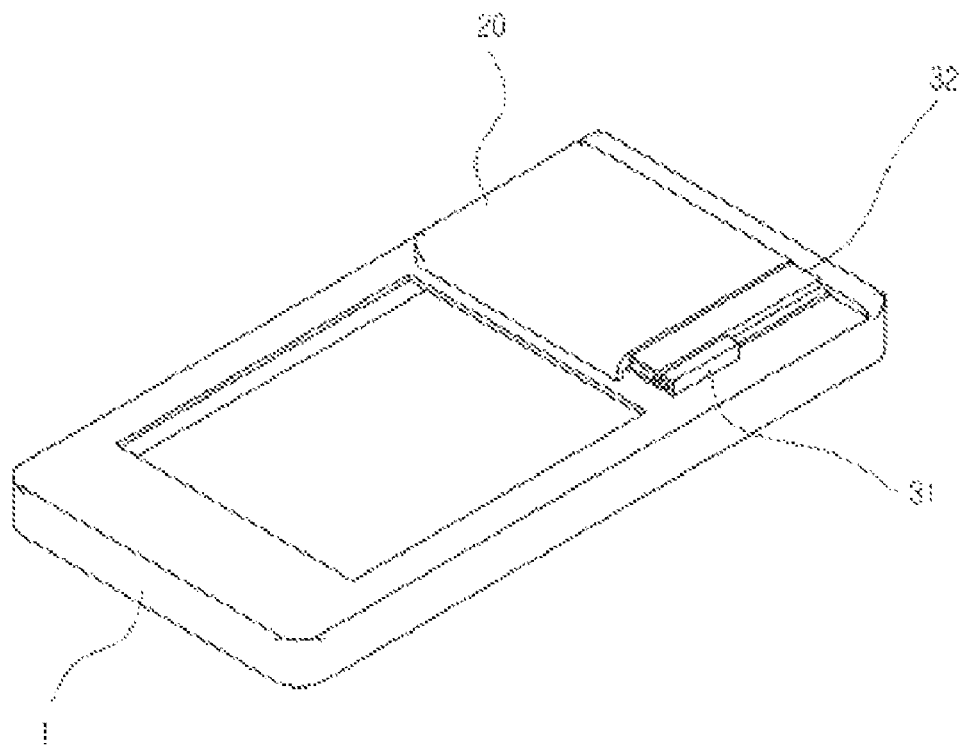
FIG. 3 is a cut-off perspective view showing an assembled state of a camera door opening/shutting apparatus for a portable communication device according to an exemplary embodiment of the present invention.
Figure 4:
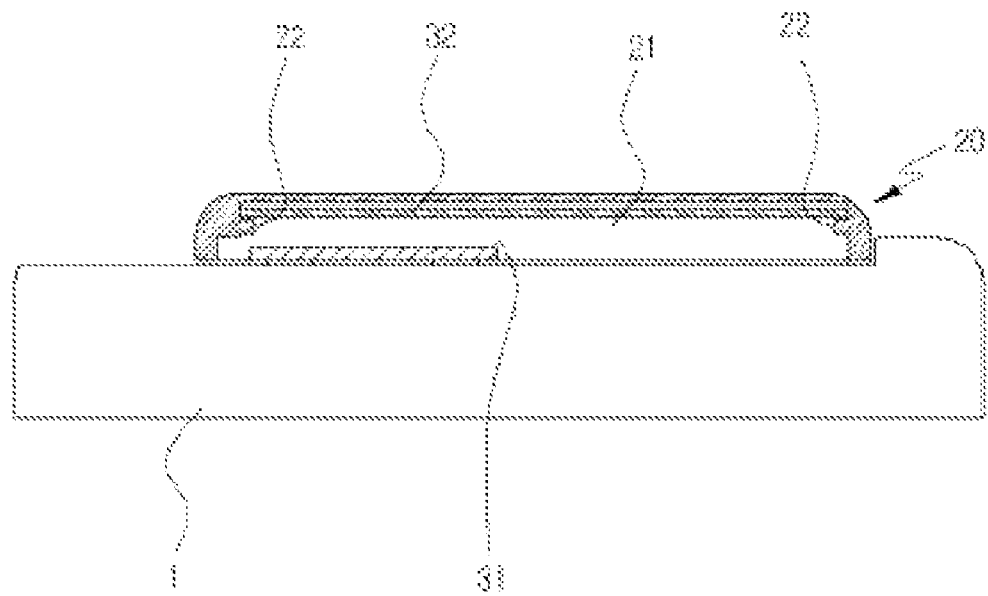
FIG. 4 is a cut-off side sectional view showing an assembled state of a camera door opening/shutting apparatus for a portable communication device according to a fourth exemplary embodiment of the present invention.

As shown in FIG. 2, FIG. 3 and FIG. 4, a mounting groove 21 is formed in the camera door 20 so as to allow the door sliding part 30 to be coupled therewith. At least one fixing part 22 is formed in the mounting groove 21 so as to allow the mounting groove 21 to be coupled with the sliding member 32 so that the sliding member 32 may be fixed in the mounting groove 21. At least one rubber part 23 is formed at a surface of a lower end of the camera door 20 so as to prevent scratches on the main body 1 of the portable communication device from the sliding of the camera door 20.

As shown in FIG. 1 and FIG. 2, the guide member 31 includes guide ribs 31a and at least one screw assembling part 31b. The guide ribs 31a are formed at both side surfaces of the guide member 31, respectively, in such a manner that they are slidably coupled with guide rails 32a formed on the sliding member 32. The screw assembling part 31b is formed in the guide member 31 so that the guide member 31 may be coupled with the main body 1 of the portable communication device by means of screws 50.

As shown in FIG. 1, FIG. 2, FIG. 3 and FIG. 4, the sliding member 32 includes the guide rail 32a and at least one locking groove 32b. The guide rails 32a are formed at both side surfaces of the sliding member 32 in such a manner that they can be slidably coupled with the guide ribs 31a. The locking groove 32b is formed in the sliding member 32 in such a manner that it is engaged with an engaging part 24 formed at the inside of the camera door 20.

As shown in FIG. 1 and FIG. 2, the elastic members 33 are made of a torsion spring 33. The torsion spring 33 has one end 33a rotatably coupled with a hole 31d formed in the guide member 31 and the other end 33b rotatably coupled with an assembling hole 32c formed in the sliding member 32 so that the torsion spring 33 provides an elastic force that allows the sliding member 32 to slide.

As shown in FIG. 1, FIG. 6, FIG. 7, FIG. 8, FIG. 9, and FIG. 10, the sliding member 32 includes a damper part 40 for restricting the sliding movement of the camera door 20 and for absorbing impact generated due to the sliding contact between the camera door 20 and the main body. The damper part 40 includes a guide hole 41, a damper member 42, and a stopper part 43. The guide hole 41 is formed in the sliding member 32 so as to guide the movement of the damper member 42, which will be described below. The damper member 42 extends through the guide hole 41 so as to be guided when the sliding member 32 slides, and a stopper part 43 is formed at both ends of the guide hole 41 so as to stop the movement of the damper member 42 when the stopper part 43 contacts the damper member 42.

Figure 7:
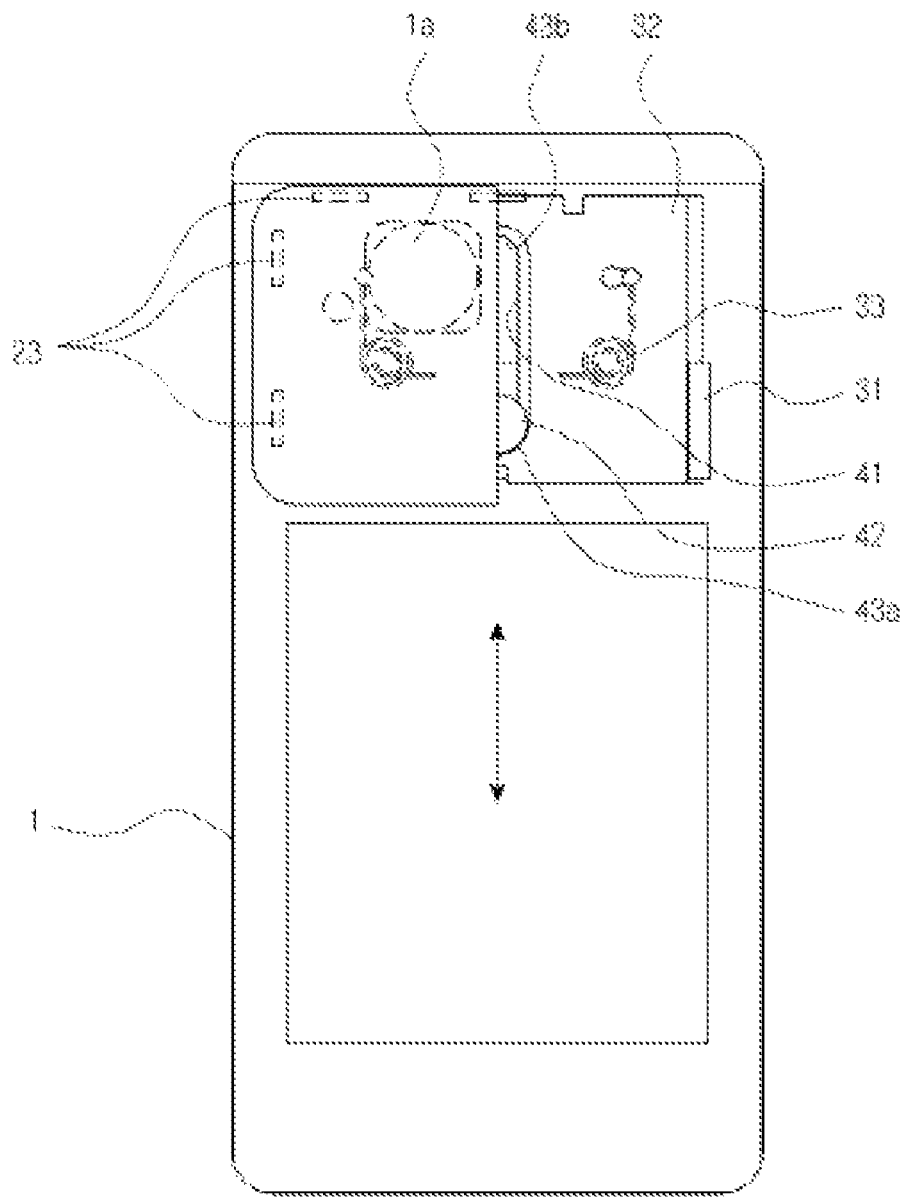
FIG. 7 is a cut-off perspective plane view showing a state where a camera door opening/shutting apparatus for a portable communication device according to an exemplary embodiment of the present invention isn't operated yet.
Figure 8:
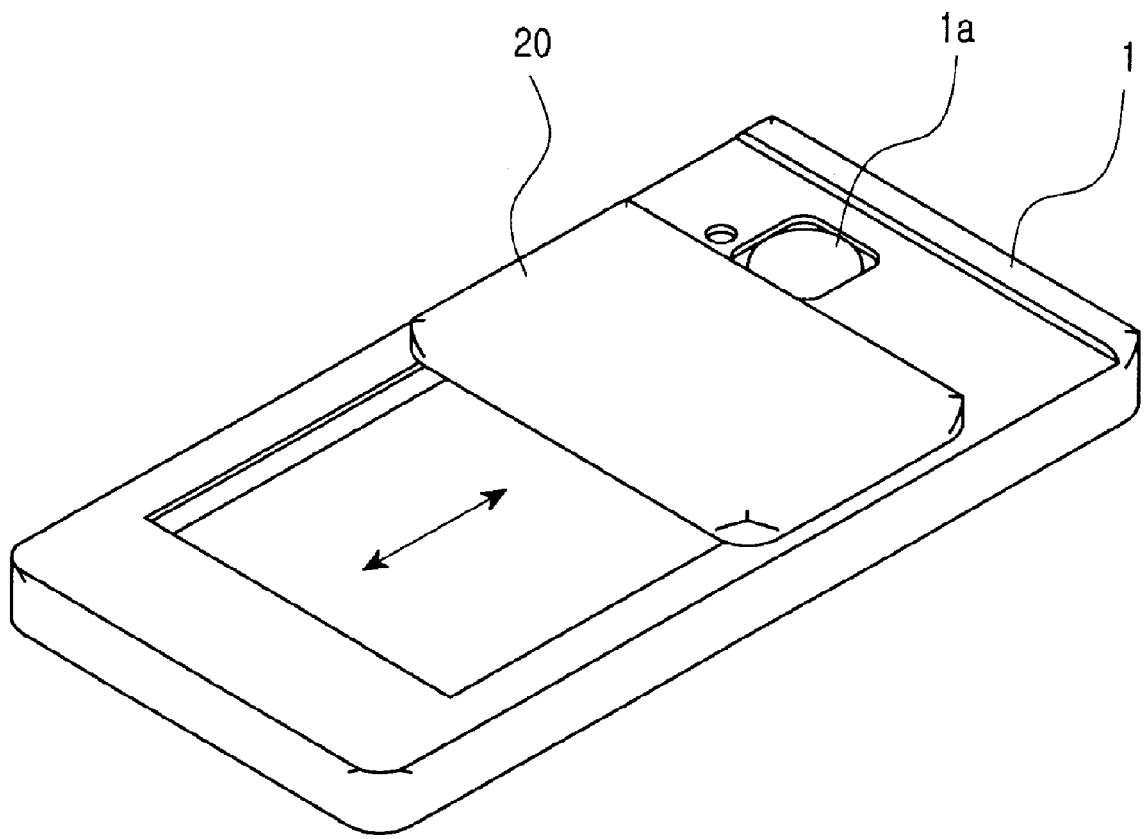
FIG. 8 is a perspective view of a camera door opening/shutting apparatus for a portable communication device according to an exemplary embodiment of the present invention, in which a camera door is slid.

As shown FIG. 1, FIG. 7, and FIG. 8, the stopper part 43 includes a first stopper 43a and a second stopper 43b. The first stopper 43a is formed at one end of the guide hole 41 so as to stop the movement of the sliding member 32 by contacting the damper member 42 when the guide hole 41 moves together with the sliding member 32 when the sliding member 32 slides back to its original position. The second stopper 43b is formed at the other end of the guide hole 41 so as to stop the movement of the sliding member 32 by contacting the damper member 42 at a position where the sliding movement is finished when the guide hole 41 moves together with the sliding member 32.

The damper member 42 may be made from rubber so as to absorb impact generated due to contact.

As shown in FIG. 2, the damper member 42 has a fixing groove 42a coupled with a fixing protuberance 31c formed at the guide member 31.

Referring to FIG. 1, FIG. 2, FIG. 3, FIG. 4, FIG. 5, FIG. 6, FIG. 7, FIG. 8, FIG. 9, and FIG. 10, the operation of the camera door opening/shutting apparatus for a portable communication device according to an exemplary embodiment of the present invention will be described below in more detail.

As shown in FIG. 1, FIG. 2, FIG. 3, and FIG. 4, the camera door opening/shutting apparatus 10 for a portable communication device includes the camera door 20 and the door sliding part 30. The door sliding part 30 includes the guide member 31, the sliding member 32, and the elastic member 33. The guide member 31 is coupled with the main body 1 of the portable communication device by means by screws 50. Here, the guide member 31 is coupled with the main body 1 by means of screws 50 through at least one screw assembling part 31b formed in the guide member 31.

Each guide rail 32a of the sliding member 32 is slidably coupled with a guide rib 31a of the guide member 31.

The pair of elastic members 33 is included between the guide member 31 and the sliding member 32.

As FIG. 2 shows, the damper member 42 of the damper part 40 extends through the guide hole 41 formed in the sliding member 32. The fixing groove 42a of the damper member 42 is coupled with the fixing protuberance 31c of the guide member 31.

As FIG. 1 and FIG. 2 show, at least one locking groove 32b of the sliding member 32 is coupled with the locking part 24 formed at the inside of the camera door 20. The sliding member 32 is inserted into the mounting groove 21 of the camera door 20, and at least one fixing part 22 formed within the mounting groove 21 is coupled with the sliding member 32 in such a manner that it is locked and fixed with the sliding member 32.

Figure 9:
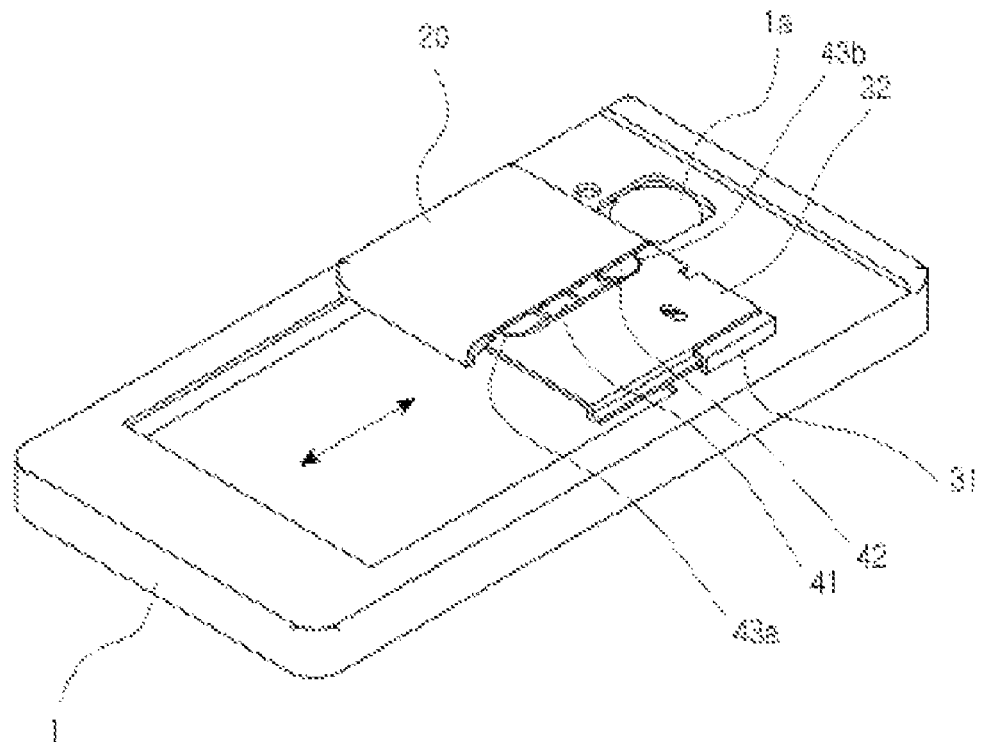
FIG. 9 is a cut-off perspective view of a camera door opening/shutting apparatus for a portable communication device according to an exemplary embodiment of the present invention, in which a camera door is slid.
Figure 10:
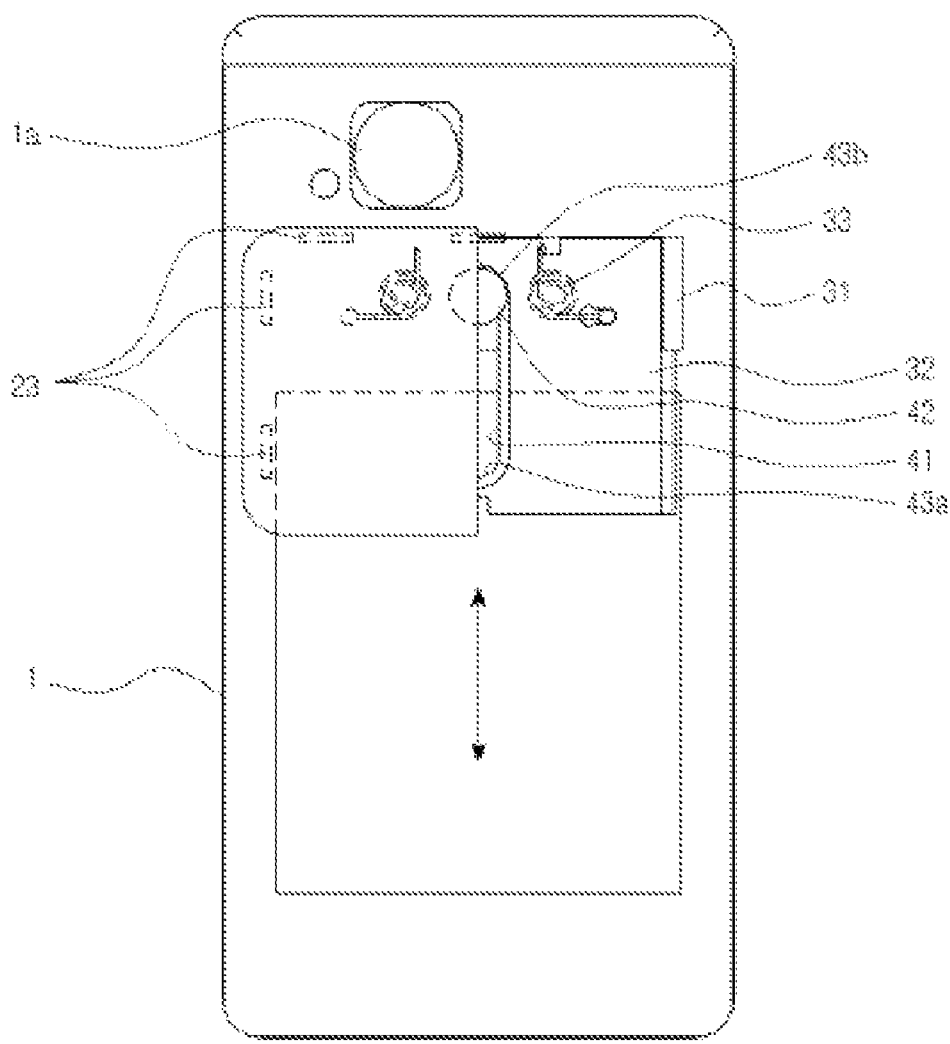
FIG. 10 is a cut-off plane view of a camera door opening/shutting apparatus for a portable communication device according to an exemplary embodiment of the present invention, in which a camera door is slid.

As shown in FIG. 8, FIG. 9, and FIG. 10, the user slides the camera door 20 in a lower direction of the main body 1 of the portable communication device to expose the camera lens 1a.

The sliding member 32 together with the camera door 20 moves, and the guide hole 41 formed at the sliding member 32 moves together with the sliding member 32.

Here, the guide rails 32a of the sliding member 32 slide along the guide rib 31a of the guide member 31.

As shown in FIG. 10, when the camera door 20 moves a predetermined distance, it is further moved due to an elastic force of the elastic member 33 so as to expose the camera lens 1a included in the main body 1. As shown in FIG. 9 and FIG. 10, the guide hole 41 is stopped by the damper member 42 of the damper part 40 when the damper member 42 contacts the second stopper 43b, which is formed at an end of the guide hole 41, at a position where movement operation of the guide hole 41 is finished. Also, the damper member 42 absorbs impact while contacting the second stopper 43b.

Figure 5:
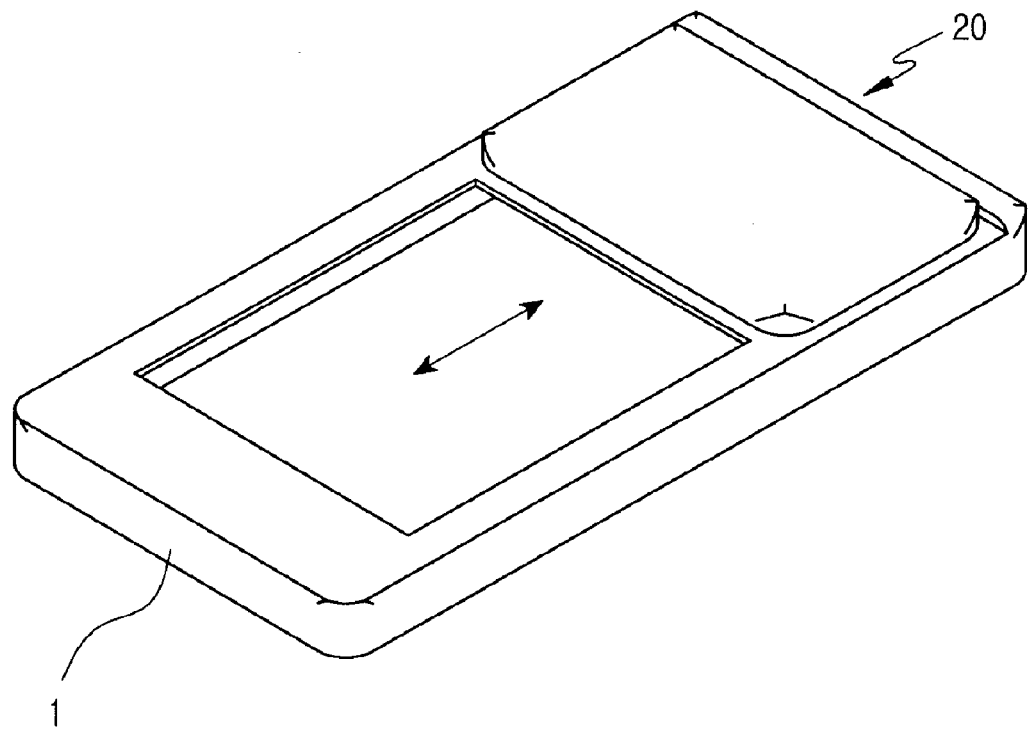
FIG. 5 is a perspective view showing a state where a camera door opening/shutting apparatus for a portable communication device according to an exemplary embodiment of the present invention isn't operated yet.
Figure 6:
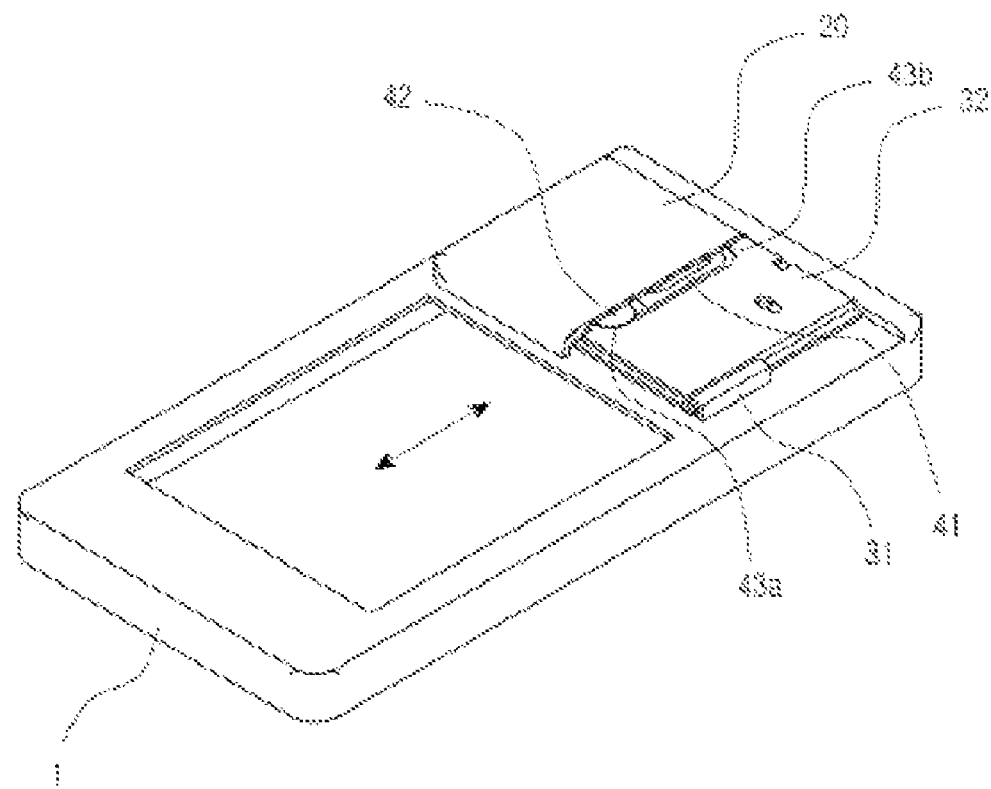
FIG. 6 is a cut-off perspective view showing a state where a camera door opening/shutting apparatus for a portable communication device according to an exemplary embodiment of the present invention isn't operated yet.

Here, as shown in FIG. 5, FIG. 6, and FIG. 7, the user may cover the camera lens 1a by sliding the camera door 20 in an upper direction of the main body 1.

As shown in FIG. 7, the guide rail 32a of the sliding member 32 slides along the guide rib 31a of the guide member 31. The elastic member 33 provides an elastic force so as to close the camera lens 1a when the camera door 20 moves beyond a predetermined distance.

As shown in FIG. 6 and FIG. 7, the second stopper 43b escapes from the damper member 42 and moves, and the damper member 42 contacts the first stopper 43a, which is formed at another end of the guide hole 41, so as to stop movement of the guide hole 41 and absorb impact. In this case, the camera door 20 together with the sliding member 32 is located at an initial position so as to cover the camera lens 1a.

As shown in FIG. 2, the camera door 20 has at least one rubber part 23 so as to prevent scratches from being formed on the main body 1 when the camera door 20 slides.

Also, the guide rib 31a of the guide member 31 is thicker than the guide rail 32a of the sliding member 32 so that floating movement of the sliding member 32 can be prevented when the sliding member 32 slides.

As described above, the camera lens 1a is exposed according to the sliding of the camera door 20. Therefore, the camera lens 1a can be easily exposed and covered, effectiveness in using the camera lens can be improved, and it is possible to prevent alien substances, dust, etc. from forming on the camera lens 1a.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A camera door opening/shutting apparatus for a portable communication device, the apparatus comprising:
   a camera door disposed at a main body to expose or cover a camera lens in the main body according to a sliding movement of the camera door; and
   a door sliding part disposed between the main body and the camera door to slidably couple the camera door with the main body,
   wherein the door sliding part comprises:
      a guide member coupled with the main body;
      a sliding member coupled with the camera door and that slides while facing the guide member; and
      a pair of elastic members disposed between the guide member and the sliding member, the elastic members providing a first force causing the camera lens to be covered when the camera door moves a distance less than a first distance, and providing a second force causing the camera lens to be exposed when the camera door moves a distance more than the first distance,
      wherein the sliding member comprises a guide hole in the sliding member between the elastic members, and a damper member extending through the guide hole to guide a sliding movement of the sliding member.

2. The camera door opening/shutting apparatus of claim 1, wherein the camera door comprises:
   a mounting groove, the door sliding part being mounted in the mounting groove;
   at least one fixing part disposed inside the mounting groove the at least one fixing part being locked and fixed with the sliding member; and
   at least one rubber part disposed at a lower side end of the camera door.

3. The camera door opening/shutting apparatus of claim 1, wherein the guide member comprises:
   guide ribs disposed at both side surfaces of the guide member; and
   at least one screw assembling part, the guide member being coupled with the main body by means of a screw in the at least one screw assembling part.

4. The camera door opening/shutting apparatus of claim 3, wherein the sliding member comprises:
   guide rails disposed at both side surfaces of the sliding member, the guide rails being movably coupled with the guide ribs of the guide member, and
   at least one locking groove, the at least one locking groove being coupled with a locking part disposed inside of the camera door.

5. The camera door opening/shutting apparatus of claim 1, wherein the elastic members comprise a torsion spring having a first end and a second end, the first end being rotatably coupled with a hole disposed in the guide member, and the second end being rotatably coupled with an assembling hole disposed in the sliding member.

6. The camera door opening/shutting apparatus of claim 1, wherein the damper member is configured to restrict the sliding movement of the camera door and absorb impact generated due to contact between the camera door and the main body.

7. The camera door opening/shutting apparatus of 6, wherein the sliding member further comprises:
   a stopper part formed at both ends of the guide hole to stop movement of the guide hole by contacting the damper member.

8. The camera door opening/shutting apparatus of claim 7, wherein the damper member comprises rubber.

9. The camera door opening/shutting apparatus of claim 7, wherein the stopper part comprises:
   a first stopper; and
   a second stopper,
   wherein the first stopper is disposed at one end of the guide hole to stop the sliding movement of the sliding member by contacting the damper member when the guide hole moves together with the sliding member when the sliding member slides back to an original position, and
   wherein the second stopper is disposed at the other end of the guide hole to stop the sliding movement of the sliding member by contacting the damper member at a position where sliding of the sliding member is finished when the guide hole moves together with the sliding member.

10. The camera door opening/shutting apparatus of claim 7, wherein the damper member comprises a fixing groove, the fixing groove being coupled with a fixing protuberance of the guide member.

11. The camera door opening/shutting apparatus of claim 4, wherein each guide rib is thicker than each guide rail.

12. A camera door opening/shutting apparatus for a portable communication device, the apparatus comprising:
   a camera door disposed at a main body to expose or cover a camera lens in the main body according to a sliding movement of the camera door; and
   a door sliding part disposed between the main body and the camera door to slidably couple the camera door with the main body, wherein the door sliding part comprises a guide member coupled with the main body, and a sliding member coupled with the camera door and that slides while facing the guide member; and
   a pair of elastic members disposed between the guide member and the sliding member, the elastic members providing a first force causing the camera lens to be covered when the camera door moves a distance less than a first distance, and providing a second force causing the camera lens to be exposed when the camera door moves a distance more than the first distance,
   wherein the sliding member comprises a guide hole in the sliding member between the elastic members, a damper member extending through the guide hole to guide a sliding movement of the sliding member, and a stopper part formed at both ends of the guide hole to stop movement of the guide hole by contacting the damper member.

* * * * *